United States Patent [19]

Savio

[11] Patent Number: 4,978,163
[45] Date of Patent: Dec. 18, 1990

[54] CAB STRUCTURE FOR A HEAVY MOTOR VEHICLE

[75] Inventor: Piero Savio, Borgaretto, Italy

[73] Assignee: Iveco Fiat S.p.A., Italy

[21] Appl. No.: 437,748

[22] Filed: Nov. 16, 1989

[30] Foreign Application Priority Data

Nov. 18, 1988 [IT] Italy .............................. 68030 A/88

[51] Int. Cl.⁵ ............................................. B62D 23/00
[52] U.S. Cl. ..................................... 296/190; 296/197
[58] Field of Search ............................... 296/190, 197;
180/89.12, 89.13, 89.18, 89.19

[56] References Cited

U.S. PATENT DOCUMENTS

| 3,551,014 | 12/1970 | Tamruchi | 52/416 |
| 4,023,851 | 5/1977 | Palmer et al. | 296/190 |
| 4,124,246 | 11/1978 | Brown et al. | 296/190 |
| 4,605,257 | 8/1986 | Lang et al. | 296/190 |
| 4,702,516 | 10/1987 | Martin, Jr. | 296/190 |
| 4,721,031 | 1/1988 | Nakata et al. | 296/190 |

FOREIGN PATENT DOCUMENTS

| 2008557 | 9/1971 | Fed. Rep. of Germany | 296/190 |
| 2105657 | 4/1972 | France | 296/190 |
| 2335388 | 12/1975 | France | 296/190 |
| 2364047 | 7/1977 | France | 296/190 |

Primary Examiner—Robert R. Song
Attorney, Agent, or Firm—Kane, Dalsimer, Sullivan, Kurucz, Levy, Eisele and Richard

[57] ABSTRACT

The structure comprises a first structural element provided with a first wall forming the cab floor and a second wall substantially orthogonal to the preceding and forming the lower part of the cab front; a second structural element provided with a rectagular frame forming the upper part of the front, and a wall substantially orthogonal to the frame and forming the front part of the cab roof; a third and fourth structural element each of which comprises a frame defining a closed surround for a door, and a side panel fixed to said frame; and a fifth structural element in the form of a substantially flat panel forming said rear wall.

10 Claims, 6 Drawing Sheets

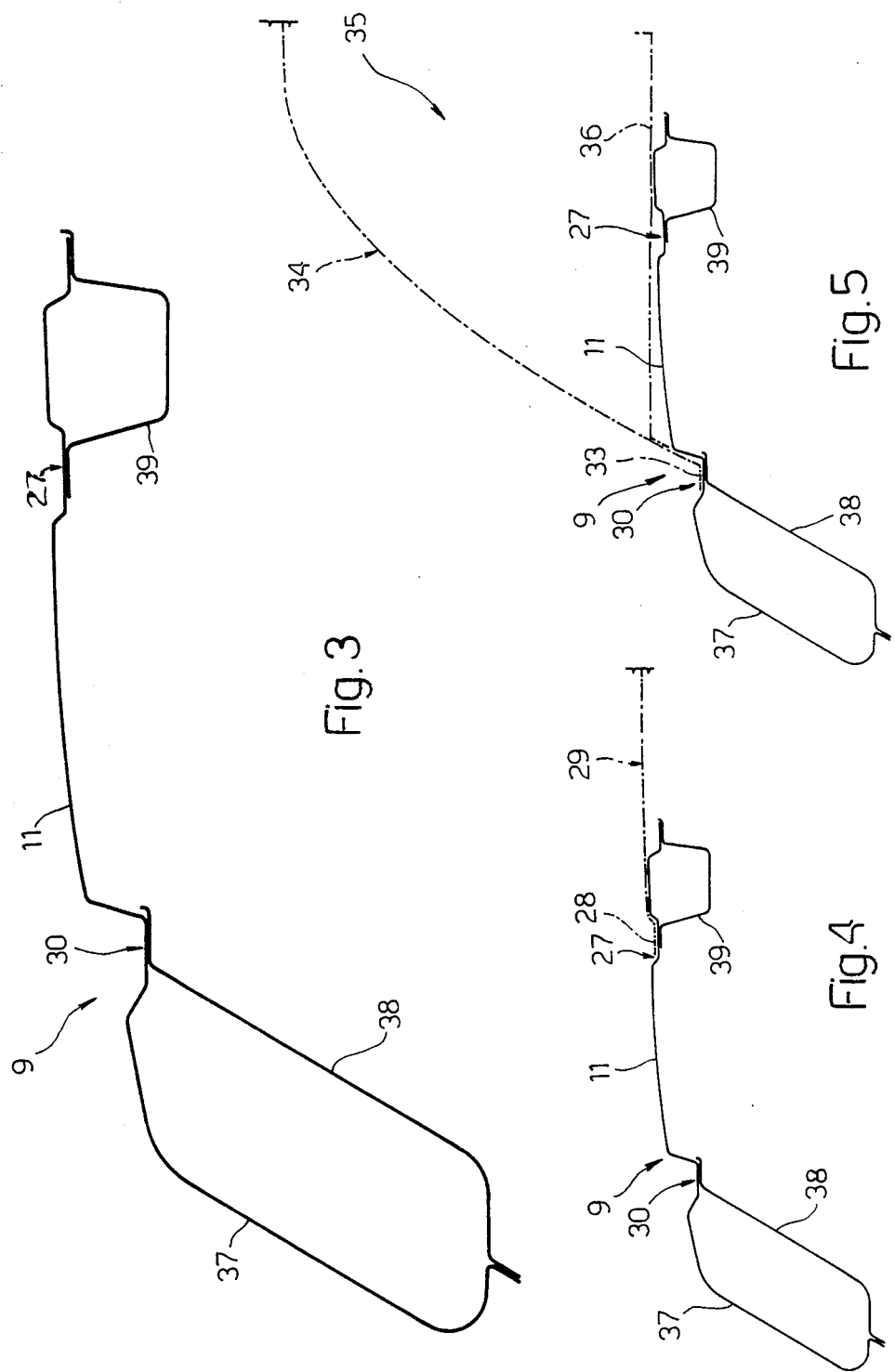

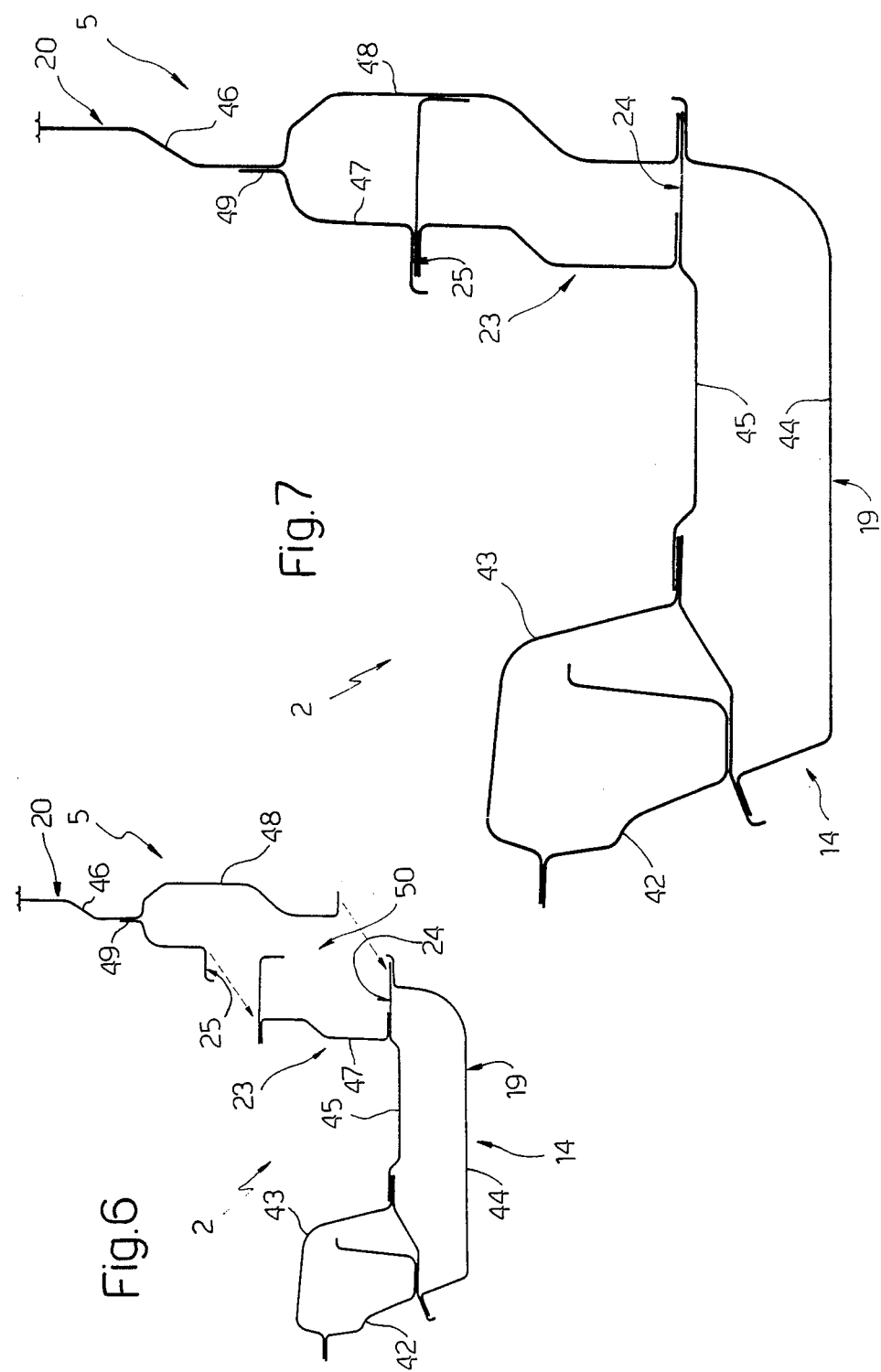

CAB STRUCTURE FOR A HEAVY MOTOR VEHICLE

BACKGROUND OF THE INVENTION

This invention relates to a cab structure for a heavy motor vehicle of the type in which the cab is disposed in a forward position in the frame.

Structures of this type comprise substantially a floor, two sides, a front and a rear wall, and are constructed by normally using welding to rigidly join together structural elements each of which is formed by joining together a plurality of sheet metal elements of fairly complex shape. The structural elements formed in this manner are provided with connection parts which are shaped to generate cross-members, longitudinal members or struts, and are mounted so that they superpose corresponding parts of the adjacent structural elements either to allow them to be joined together or to give high rigidity and mechanical strength to the structure. Cab structures formed by joining together such structural elements have numerous drawbacks.

Firstly, to construct cabs of one and the same series but for use on vehicles of different dimensions, a large number of structural elements are required because each can be used on only one cab of particular dimensions, and therefore each cab of the series can be constructed only by using one particular combination of structural elements.

In addition, in certain cases the mechanical strength and rigidity of the obtained structure are not very high, particularly because of the large number of connection zones between the various sheet metal elements which comprise the structural elements.

Again, the cabs obtained are very complicated because of the shape of the relative structural elements, and lengthy operations are involed in their construction. In this respect, each structural element is provided with the aforesaid connection elements and these must be kept in their correct relative position when joining the various elements. In particular, with such structural elements it is very difficult and in some cases impossible to automate cab assembly using welding robots.

Finally, the storage and transportation of such structural elements is not simple because of their size.

SUMMARY OF THE INVENTION

The object of the present invention is to provide a cab structure of this type which is free of the aforesaid drawbacks, and in particular is composed of only a few structural elements which can also be used for constructing cabs of different dimensions, is able to be assembled automatically by welding robots, and is of high mechanical strength and rigidity.

This object is attained by a cab structure for a heavy motor vehicle of the type in which the cab is disposed in a forward position on the frame, said structure comprising substantially a floor, two sides, a front and a rear wall, characterised by comprising:

a first structural element provided with a first wall forming said floor and a second wall substantially orthogonal to the preceding and forming the lower part of said front;

a second structural element provided with a rectangular frame forming the upper part of said front, and a wall substantially orthogonal to said frame and forming the front part of the cab roof;

a third and fourth structural element each of which comprises a frame provided with a pair of uprights and a pair of longitudinal members and defining a closed surround for a door, and with a side panel fixed to said frame, each frame with its relative panel forming one of the sides;

a fifth structural element in the form of a subatantially flat panel for forming said rear wall.

BRIEF DESCRIPTION OF THE DRAWINGS

The structure of the present invention will be more apparent from the description of one embodiment thereof given hereinafter with reference to the accompanying drawings in which:

FIG. 3 is a section through a second structural element on the line III—III of FIG. 1;

FIGS. 4 and 5 are the same sectional view as FIG. 3 but showing other component parts of the vehicle cab;

FIGS. 6 and 7 are sections through other structural elements on the line VI—VI of FIG. 4, before and after joining together two sturctural elements respectively;

DETAILED DESCRIPTION OF THE INVENTION

Figure 1:
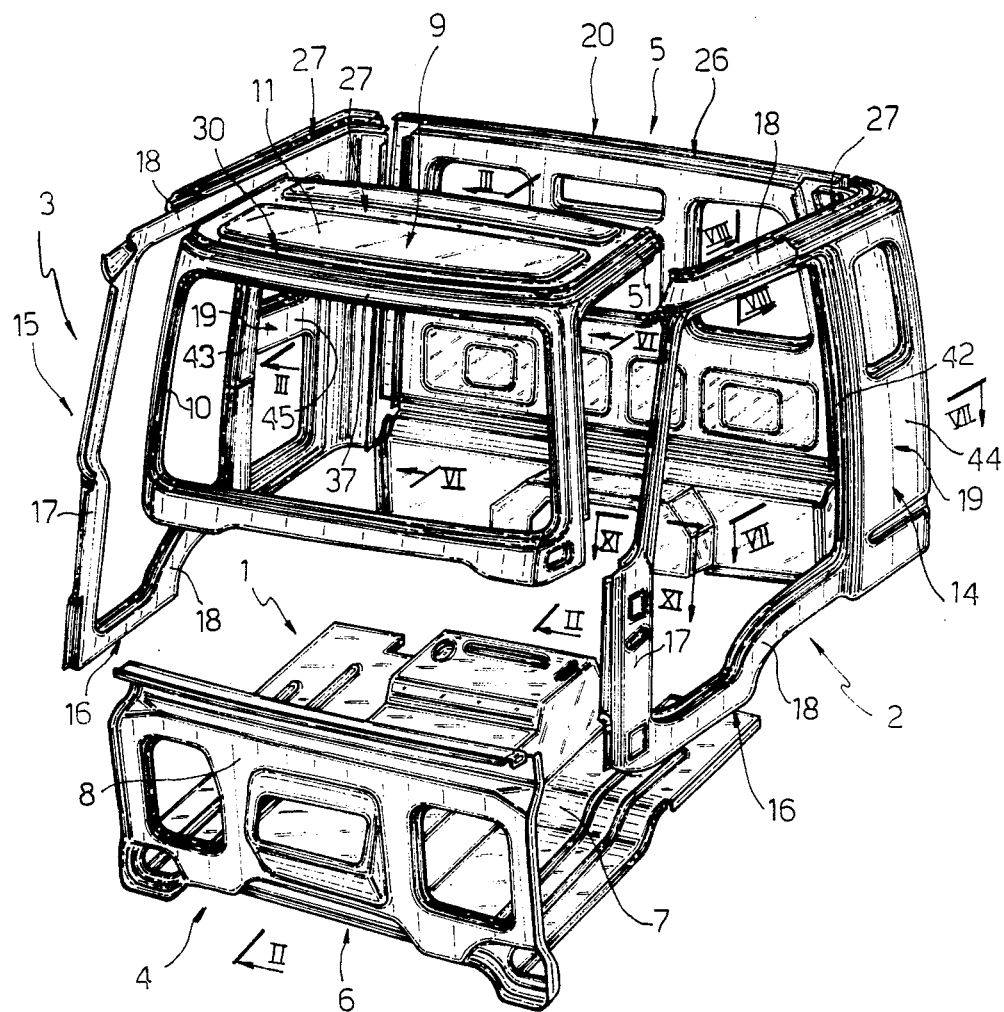
FIG. 1 is an exploded perspective view of the cab structure of the invention in which its constituent structural elements are visible.
Figure 2:
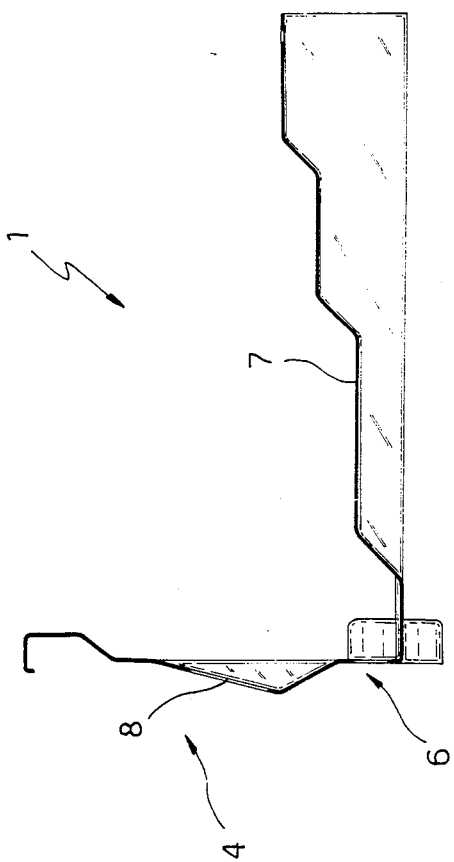
FIG. 2 is a section through a first structural element on the line II—II of FIG. 1.

The structure of the invention, shown perspective view in FIG. 1, is designed to form a cab for a heavy motor vehicle of the type in which the cab is in a forward position on the frame and comprising substantially a floor 1, two sides 2 and 3, a front 4 and a rear wall 5. Said structure comprises substantially five structural elements visible in perspective view in FIG. 1 in an exploded arrangement in which they have not yet been joined together to form the cab. A first structural element, indicated by 6, provided with a first wall 7 forming the floor 1, and a second wall 8 substantially orthogonal to the latter and forming the lower part of the front 4. A second structural element, indicated by 9, is provided with a rectangular frame 10 forming the upper part of the front 4, and a wall subatantially orthogonal to said frame 11 and forming the front part of the cab roof. A third and fourth structural element 14, 15 each comprise a frame 16 provided with a pair of uprights 17 and a pair of longitudinal members 18 arranged to define a closed surround for a door (not shown); each of ssaid structural elements 14 and 15 also comprises a side panel 19 fixed to the frame 16 to thus form one of the sides 2, 3 of the structure.

The structure of the invention also comprises a fifth substantially flat structural element 20 forming the rear wall 5 of the structure.

As can be seen clearly in FIGS. 6 and 7, the side panel 19 comprises an upright 23 which is fixed to the rear vertical edge 24 thereof. Said upright is disposed substantially in a plane orthogonal to that in which the panel 19 is disposed and coincides with that in which the fifth structural element 20 (FIG. 7) is located. Each of the uprights 23 is arranged to be connected to a corresponding vertical edge 25 (FIG. 6) of the structural element 20.

The wall 11 of the second structural element 9, the longitudinal members 18 of the frames 16 of the third and fourth structural element 14 and 15 and the upper edge 26 (FIG. 1) of the fifth sturctural element 20 are provided with channels 27 which when the structural elements are connected together define a continuous annular seat. Said seat can house the edges 28 (FIG. 4) of a roof panel 29 to be fixed to the structure. Said roof panel is constructed conveniently of plastics material and can be joined to the structure by applying an adequate quantity of adhesive inside the seats 27, which are in the form of channels, and laying the edges 28 of the roof panel on the adhesive layer formed. The wall 11 of the second structural element 9 also comprises further channels 30 (FIGS. 1, 3, 4 and 5), which are in communication with the channel 27 of the third, fourth and fifth structural element 14, 15 and 20, in such a manner as to define a further continuous seat for the edges 33 (FIG. 5) of a further roof panel 34 to be fixed to the structure and to define therewith a housing 35 for a bed 36, which is disposed substantially above the wall 11 as is clear from FIG. 5.

Figure 8:
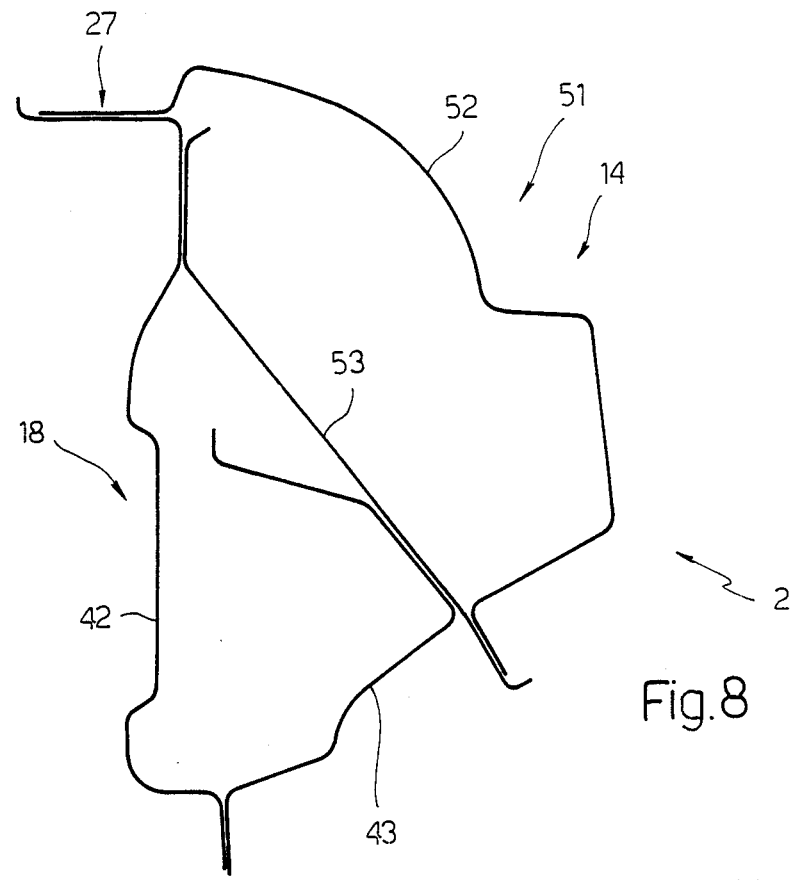
FIGS. 8 and 9 are sections through other structural elements on the line VIII—VIII of FIG. 1, respectively before and after their joining together.
Figure 9:
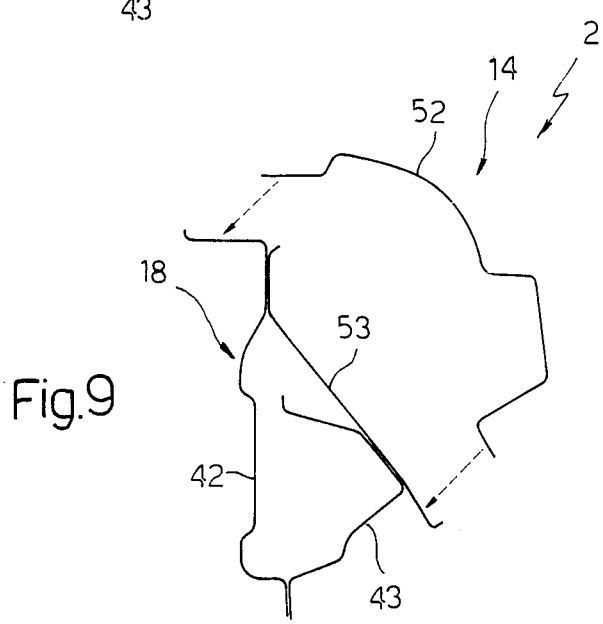
Figure 10:
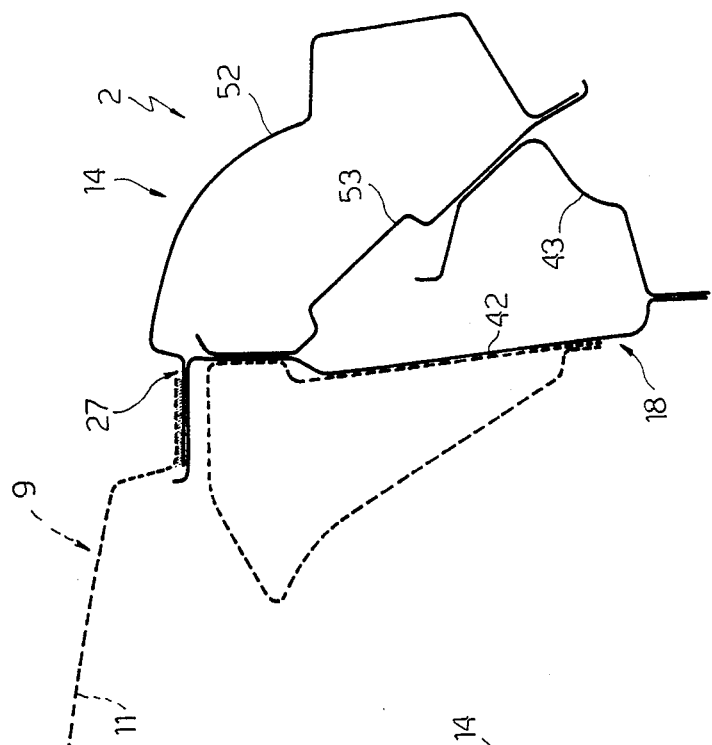
FIG. 10 is a section analogous to that of FIG. 9, but with other structural parts added.
Figure 11:
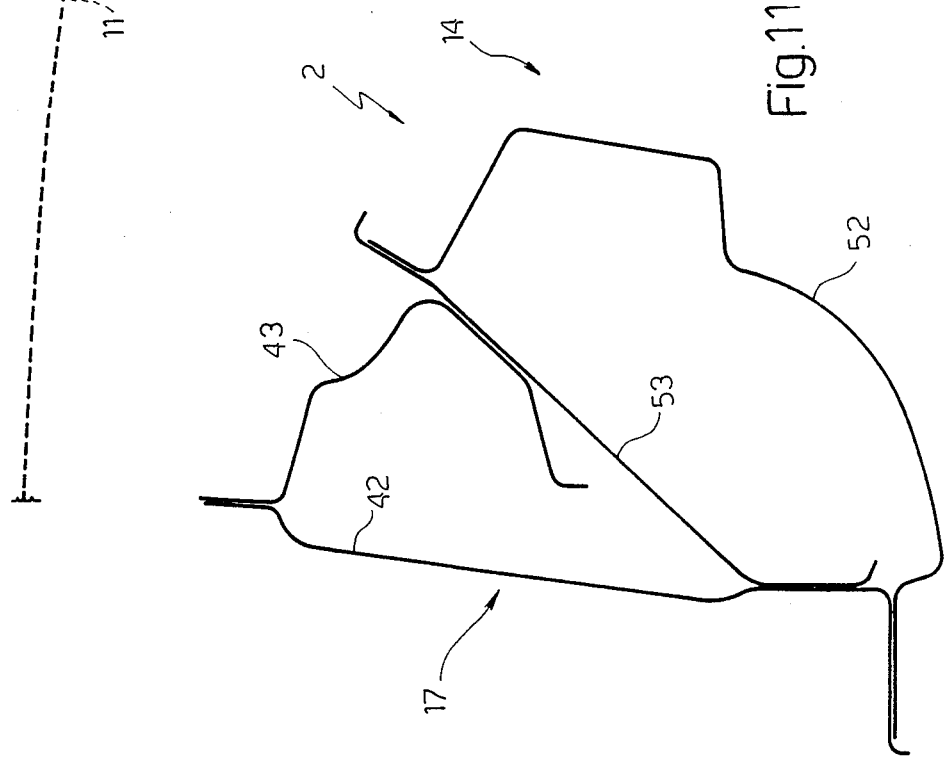
FIG. 11 is a section through two structural elements on the line X—X of FIG. 1.

The wall 11 is suitably stiffened by a beam 39 (FIGS. 3, 4 and 5) fixed to the lower surface of said wall. The frame 10 (FIG. 1) if the second structural element 9 conveniently comprises at least two deep-drawn walls 37 and 38 (FIG. 3) which are joined together to define a tubular frame. Likewise the frame 16 (FIG. 1) of the third and fourth sturctural element 14 and 15 comprises two deep-drawn walls 42 and 43 (FIGS. 6 and 9), each in one piece, which are joined together to define a tubular frame. Two of the sections through the frame thus formed are visible in FIGS. 6, 7 and 9. The side panel 19 which forms part of one of the structural elements 14 and 15 also comprises two deep-drawn walls 44, 45 (FIGS. 6 and 7) which are joined together in the manner illustrated in said figures. The fifth structural element 20 (FIGS. 6 and 7) comprises a substantially flat central wall 46, a pair of vertical flanges 47 and 48 fixed to each vertical edge 49 of the wall 46 and arranged to be fixed to a corresponding upright 23 of the third and fourth structural element 14 and 15, in the manner shown in FIGS. 6 and 7. The flanges of each pair have a different width and each of the uprights 23 has a substantially U-shaped cross-section with its open side (indicated by 50 in FIG. 6) towards the rear part of the cab. The flange 48 is of greater width and is superposed on the open side to close it, as is clear from FIG. 7. The frame 10 (FIG. 1) of the second structural element 9 comprises a pair of tubular arms 51 to which the wall 11 is fixed, each arm superposing and being fixed to a corresponding longitudinal member 18 of the frame 16 of the third and fourth structural element 14 and 15. As can be seen from FIG. 9 each arm 51 is also obtained by superposing two walls 52 and 53. The method of connecting the wall 52 to the wall 53 is shown schematically in FIG. 8.

The described structure is composed of only a few structural elements which can be easily connected together and are of very simple shape. The structure is suitable for forming cabs of one and the same series but which are designed for vehicles of different dimension. In this respect, the same frame 16 can be used in all cabs of the series and receive doors of the same dimensions, and the structural elements 14 and 15 which form the cab sides are obtained simply by connecting different-dimension side panels to said frames. In addition, in the case of cabs of the series which have different widths, the structural elements 20 which form the cab rear wall 5 are obtained simply by using central walls 46 (FIGS. 6 and 7) of different width, whereas all the other components of the structural elements, and in particular the flanges 47 and 48, can remain the same for all cabs of the series.

The structure can easily be used for different body constructions. If it is to be provided only with a flat roof 29 (FIG. 4), it is necessary only to fix the roof panel onto the structure as shown in FIG. 4, by applying an adequate layer of adhesive between its edges 28 and the channels 27. However, if the cab is to be provided with a roof 34 forming a housing 35 such as that shown in FIG. 5, the edges 33 of the roof panel can be disposed within said channels 30 and 27.

The mechanical strength and rigidity of the structure obtained are very high. In this respect, the various structural elements are composed of just a few walls joined together and are of box form. In particular, as stated, each frame 16 of the structural elements 14 and 15 consists only of an outer side wall 42 and an inner side wall 43, each of which is constructed in a single piece. As the connection zones between the various sheet metal elements which comprise the structural elements are few in number and as the connection between them is made substantially along their vertical edges, the mechanical strength and rigidity of the assembly are very high.

The structural elements which comprise the structure are very simple and therefore of small overall size, and can therefore be transported and stored with ease. In particular, they do not comprise connection elements of complicated shape which project from the elements rather than being directly superposable on corresponding connection elements of adjacent structural elements, with the resultant advantage that the elements can be easily connected together, in particular by automated assembly using welding robots.

It is apparent that modifications can be made to the described structure but without leaving the scope of the invention.

I claim:

1. A cab structure for a heavy motor vehicle of the type in which the cab is disposed in a forward position on the frame, said structure comprising substantially a floor (1), two sides (2, 3), a front (4) and a rear wall (5), characterized by comprising:
   a first structural element (6) provided with a first wall (7) forming said floor and a second wall (8) substantially orthogonal to the preceding and forming the lower part of said front;
   a second structural element (9) provided with a rectangular frame (10) forming the upper part of said front, and a wall (11) substantially orthogonal to said frame and forming the front part of the cab roof;
   a third and fourth structural element (14, 15) each of which comprises a frame (16) provided with a pair of uprights (17) and a pair of longitudinal members and defining a closed surround for a door, and a side panel (19) fixed to said frame, said side panel further comprised of an upright (23) which is fixed to the rear vertical edge (24) of the side panel (19), each said frame with said side panel forming one of the sides;

a fifth structural element (20) in the form of a substantially flat panel for forming said rear wall.

2. A structure as claimed in claim 1, characterized in that said panel (19) of each of said third and fourth structural elements (14, 15), comprised of said upright (23) fixed to the rear vertical edge (24) of the relative said panel (19), is disposed in a plane orthogonal to that in which the panel is disposed and substantially coinciding with the plane in which uprights being connectable to a corresponding vertical edge (25) of said fifth structural element.

3. A structure as claimed in claim 1, characterised in that said wall (11) of said second structural element (9), the upper longitudinal members (18) of said frames (16) of said third and fourth structural element (14, 15) and the upper edge (26) of said fifth structural element (20) are provided with channels (27) which when said structural elements are connected together define a first continuous seat for the edges (28) of a first roof panel (29) to be fixed to the structure.

4. A structure as claimed in claim 1, characterised in that said wall (11) of said second strucural element comprises further channels (30) in communication with the preceding channels (27) of said third, fourth and fifth structural element (14, 15, 20), to form a second continuous seat for the edges (33) of a second roof panel (34) to be fixed to the structure in order to define therewith a housing (35) for a bed (36).

5. A structure as claimed in claim 1, characterised in that said wall (11) of said second structural element (9) is stiffened by a beam (39) fixed to the lower surface of said wall.

6. A structure as claimed in claim 1, characterised in that said frame (10) if said second structural element (9) comprises at least two deep-drawn walls (37, 38) joined together to define a tubular frame.

7. A structure as claimed in claim 1, characterised in that said frame (16) of each said third and fourth structural element (14, 15) comprises two deep-drawn one-piece walls (42, 43) joined together to define a tubular frame, said side panel (19) of said third and fourth element (14, 15) comprising two deep-drawn walls (44, 45) joined together.

8. A structure as claimed in claim 1, characterised in that said fifth structural element (20) comprises a substantially flat central wall (40), and a pair of vertical flanges (47, 48) fixed to each vertical edge (49) of said wall and arranged to be fixed to a corresponding upright (23) of said third and fourth structural element (14, 15).

9. A structure as claimed in claim 8, characterised in that said flanges (47, 48) of each pair are of different width, each of said uprights (23) being of substantially U cross-section with its open side (50) facing the rear of the cab, the flange (48) of each of said pairs being of greater width and arranged to overlie said open side.

10. A structure as claimed in claim 1, characterised in that said frame (10) of said second structural element (9) comprises a pair of tubular arms (51) to which said wall (11) of said second structural element (9) is fixed, and each of which being arranged to overlie and be fixed to a corresponding longitudinal member (18) of said third and fourth structural element (14, 15).

* * * * *